United States Patent [19]

Arff

[11] 4,402,641
[45] Sep. 6, 1983

[54] SELF CENTERING FASTENER

[75] Inventor: Heino Arff, Norderstedt, Fed. Rep. of Germany

[73] Assignee: ITW Ateco GmbH, Norderstedt, Fed. Rep. of Germany

[21] Appl. No.: 238,718

[22] Filed: Feb. 27, 1981

[30] Foreign Application Priority Data

Apr. 17, 1980 [DE] Fed. Rep. of Germany ....... 3014745

[51] Int. Cl.³ ............................................. F16B 13/02
[52] U.S. Cl. .................................... 411/510; 411/908; 24/297
[58] Field of Search ................ 411/510, 509, 508, 908, 411/907, 904; 24/213 R, 213 CS, 214, 297

[56] References Cited

U.S. PATENT DOCUMENTS

| 3,139,784 | 7/1964 | Moorman | 411/510 |
| 3,481,242 | 12/1969 | Topf | 411/510 X |
| 3,483,787 | 12/1969 | Saunders | 411/510 |
| 3,810,279 | 5/1974 | Swick et al. | 411/509 |
| 4,261,243 | 4/1981 | Palmer | 411/510 |

FOREIGN PATENT DOCUMENTS

| 66048 | 3/1969 | German Democratic Rep. | 411/510 |
| 1396103 | 6/1975 | United Kingdom | 411/510 |
| 2020733 | 11/1979 | United Kingdom | 411/508 |

Primary Examiner—Cornelius J. Husar
Assistant Examiner—Neill R. Wilson
Attorney, Agent, or Firm—Jack R. Halvorsen; Thomas W. Buckman

[57] ABSTRACT

A one-piece fastening element of synthetic material, comprising a head and a relatively rigid axial shank adapted to be inserted into the aperture of a workpiece. The shank is formed with two or several axial rows of flexible lamellar radial ribs formed integrally with the shank in circumferentially offset and axially spaced arrangement.

8 Claims, 7 Drawing Figures

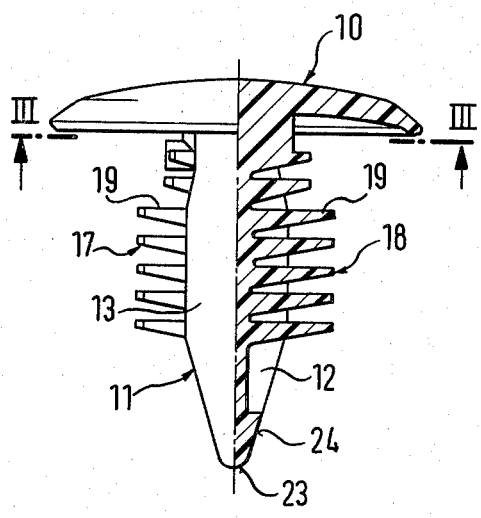
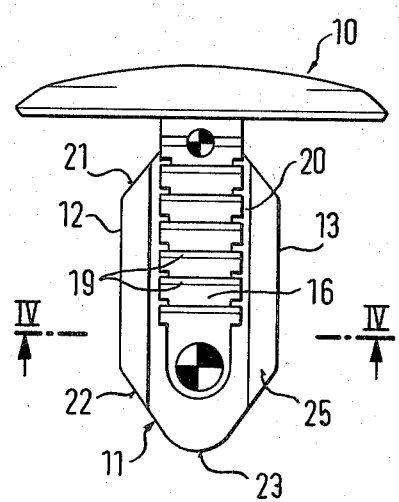
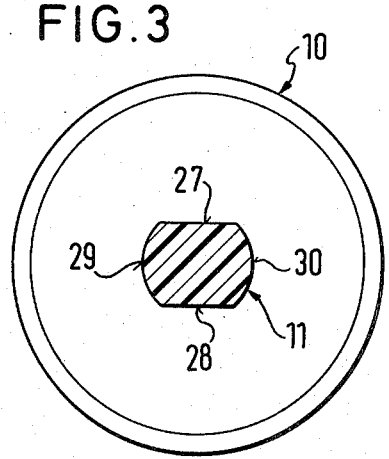
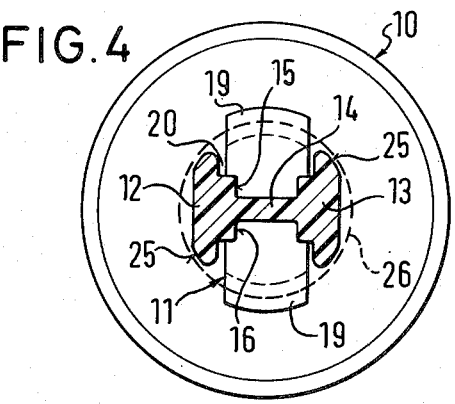

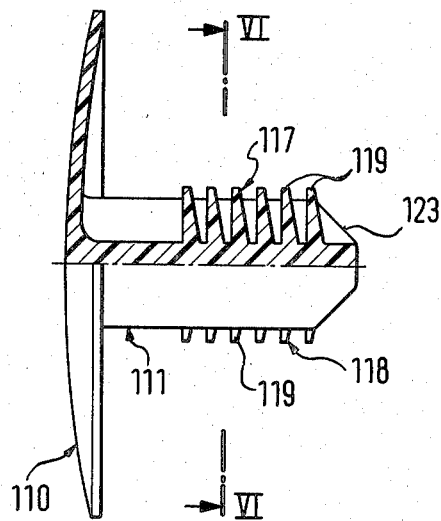
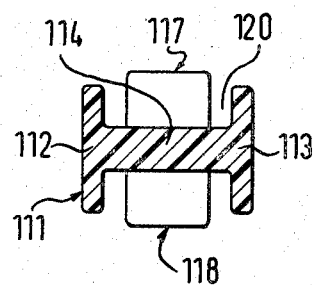
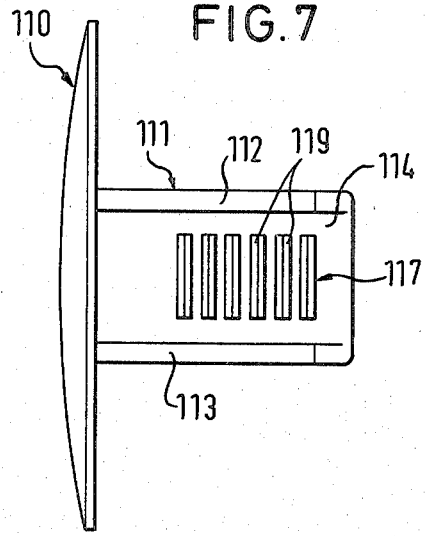

SELF CENTERING FASTENER

BACKGROUND OF THE INVENTION

Generally fastening elements of the type shown are already known (German disclosure letter No. 24 06 231). It serves to fasten an article to a workpiece provided with an aperture, e.g. a sheet metal plate. The lamellar flexible ribs make possible an effective fastening of articles of different thicknesses to a holding element, in that dependent on the thickness of the article a corresponding lamellar rib grips beneath the edge of the aperture at the underside of the holding element, for instance, a sheet metal plate. The handling of such fastening elements is extremely simple, because they only have to be forced or beaten into an aperture via their head. For this reason the field of application of such fastening elements also is extraordinarily wide and many-sided.

The described known fastening element has proved to be extremely useful in practice. In the known fasteners, nevertheless, the danger exists sometimes that the lamellar ribs may be loaded too much and will break away because of their relatively short length (see U.S. Pat. No. 3,810,279) when the shank of the fastening element is not centrically introduced into the fastening aperture.

SUMMARY OF THE INVENTION

It is therefore the object of the invention to provide a one-piece fastening element of synthetic material in which the lamellar radial ribs are stressed only within admissible limits but nevertheless entirely fulfill their holding function.

The object of this invention is fulfilled in accordance with the invention in that between adjacent rows of lamellar ribs an axially extending rib is respectively formed in a circumferential direction integrally with the shank which is provided with at least one axial guide surface adapted to be brought into contact with the aperture wall of a workpiece.

While with the above mentioned known fastening element the lamellar ribs are the portions of the fastening element projecting farthest in the radial direction and a recess is respectively arranged between adjacent rows of lamellar ribs. Provision is made by the instant invention for an axially extending rib to be disposed between adjacent rows of ribs which may be brought into contact with the aperture wall radially. With the aid of such axial ribs, which are preferably disposed diametrically with respect to the shank axis, the shank may be centered upon insertion of the fastening element into an aperture of a workpiece so that upon engagement with the aperture wall all the lamellar ribs are deformed uniformly and thus are uniformly loaded. Excessive loading and the danger of individual ones of the laminations breaking away are thus avoided. With the fastening element according to the instant invention, the shank is arranged centrically in the fastening aperture and an absolutely safe anchoring of the fastening element is obtained.

To facilitate the introduction into a fastening aperture, provision is made in one embodiment of the invention for the axial rib to radially taper towards the free end of the shank.

In a preferred embodiment of the known fastening element (see U.S. Pat. No. 4,261,243) four rows of lamellar ribs are formed integrally with the shank respectively offset through 90°. Provision is made in the instant invention for two diametrically opposed rows of lamellar ribs to be arranged on the shank with axial ribs comprising two circumferentially spaced axial guide surfaces. With the aid of four circumferentially spaced guide surfaces, as disclosed herein, it is possible to obtain a relatively exact centering of the fastening element in the workpiece, independently of whether the workpiece aperture is of circular or rectangular cross-sectional configuration. It goes without saying that instead of a guide surface a line contact may also be taken into consideration (in which it will, however, have to be taken into account that in practice an ideal line contact is not normally given).

In a preferred embodiment of the invention, provision is made for the shank and the axial ribs integrally formed therewith to be of a double-T-shape cross sectional configuration with the lamellar ribs accommodated by the recesses between the transverse webs on either side of the longitudinal web but being at least in part freely movable with respect to the transverse webs. Such a construction is simple to manufacture, i.e. by injection molding using relatively simple tools. Besides, such a shank configuration provides for a safe guidance and centering of the shank in a workpiece aperture and as seen in the drawings, a lamellar rib having a substantially longer length.

In another embodiment of the invention it is provided that for rectangular apertures the transverse webs of the double-T-shape shank are slightly shorter than the width, and the spacing of the outsides of the transverse webs is slightly smaller than the length of the aperture. Such a shank may be inserted into a rectangular aperture leaving a slight play with respect to the double-T-shape and ensures that the lamellar ribs are uniformly brought into engagement with the aperture wall on opposite sides and are thus uniformly deformed and loaded, i.e. both during the procedure of insertion and also afterwards.

For circular workpiece apertures it is provided in another embodiment of the invention that the transverse webs of the double-T-shape shank are tapered at the outer corners for the formation of the guide surfaces. It may indeed be imagined to provide the guide surfaces with a radius adapted to the radius of the fastening aperture in order to establish snug engagement with the aperture wall; as, however, the width of the guide surface is relatively small, it suffices also to design the guide surface to be planar.

In connection with the last mentioned embodiment provision is made in a further development of the invention for the shank to be reduced in cross section in the region of the ribs in the direction of the radial extension thereof. In this manner a substantial saving of plastic material may be obtained in the formation of the shank of the fastening element and the length of the ribs is increased.

In the following, two examples of embodiments of the invention will be described by way of the drawings:

BRIEF DESCRIPTION OF THE DRAWINGS

FIG. 1 shows a part-sectional side elevational view of the fastening element according to the invention.

FIG. 2 shows a side view of the fastening element according to FIG. 1.

FIG. 3 shows a sectional view of the fastening element according to FIG. 1 taken on line 3—3.

FIG. 4 shows a sectional view of the fastening element according to FIG. 2 taken on line 4—4.

FIG. 5 shows a side view partly in section of another embodiment of a fastening element according to the invention.

FIG. 6 shows a sectional view of the fastening element according to FIG. 5 taken on line 6—6.

FIG. 7 shows another side view of the fastening element according to FIG. 5.

Prior to enlarging in more detail on the views shown in the drawings it is stated that each feature is of inventively essential significance by itself or in connection with features of the claims insofar as it has not been included in the prior art.

The clip type fastening element shown in FIGS. 1 to 4 possesses a plate-shaped head 10 and a shank 11 extending axially from said head 10, which it will now be dealt with in more detail.

The shank 11 is provided with a double-T-shaped cross-sectional configuration over the greatest portion of its extension, as to be seen from FIG. 4. Thus, there are provided two transverse webs 12, 13 and a longitudinal web 14 interconnecting them. As will be seen furthermore from FIG. 4, the longitudinal web 14 is provided with rectangular recesses 15, 16 on the opposing longitudinal sides thereof which are for material saving purposes.

On opposing sides of the longitudinal web 14 two rows 17, 18 of lamellar, radial flexible ribs 19 are formed integrally with said web 14 between the transverse webs 12, 13. Each of the ribs of each row are axially spaced from each other. The ribs 19 which are arranged in the form of a Christmas Tree ® fastener have an approximately triangular cross-sectional configuration and in their inclination are slightly pointing towards the head 10. In the shown embodiment, the lower five ribs have essentially the same axial width and radially extending length, while the upper two ribs are shaped to be clearly visibly shorter. The ribs 19 are spaced from the facing side of the transverse webs 12, 13 through a certain distance as identified at 20 in order to permit a free bending deformation of the ribs 19 with respect to the shank 11 and the transverse webs 12, 13 thereof, respectively.

The transverse webs 12, 13 form axial ribs which are tapering upwards towards the head 10 and downwards as indicated at 21 and 22, respectively, in FIG. 2. The taper 22 at the free end of the shank 11, which is obtained by bevelling, merges into the rounded tip 23 formed by the longitudinal web 14. As will be seen in FIG. 1, a taper of the longitudinal web is provided also in the direction which is offset by 90° as indicated at 24.

The transverse webs 12, 13 and the axial ribs formed thereby, respectively, are tapered at the outer corners, as indicated at 25. By the tapers 25 four diametrically opposed guide surfaces are formed which substantially conforms to the diameter of a circular fastening aperture, as indicated in FIG. 4 by the dotted line 26. The guide surfaces, as mentioned, center the shank 11 in the workpiece aperture 26 so that the flexible ribs 19 which by their radial extension thereby extend beyond the width of the aperture 26 are uniformly deformed and loaded.

The connection of the shank 11 to the head 10 may be recognized from FIG. 3. The shank 11 possesses in cross section two parallel straight sides 27, 28 and two opposite arcuate sides 29, 30.

The embodiment shown in FIGS. 5 to 7 is intended for a rectangular workpiece aperture and possesses again a plate-shaped head 110 and a shank 111 extending axially thereof. The cross section of the shank, as shown in FIG. 6, is again double-T-shaped and thus comprises two transverse webs 112, 113 and one longitudinal web 114. On both longitudinal sides of the longitudinal web 114 two rows 117, 118 of lamellar radially extending flexible ribs 119 are again formed integrally with said web the function of which is the same as the flexible ribs 19 as discussed according to FIGS. 1 to 4. Spaces 120 are provided between the ribs 119 and the transverse webs 112, 113 in order to make possible a flexible bending of the ribs 119 with respect to the shank 111 and the webs 112, 113.

The transverse webs 112, 113 and outwardly facing surfaces thereof facing the aperture wall, respectively, are inserted into a rectangular aperture with slight play and thus serve centering purposes and to ensure a centered seating in the workpiece aperture. The ribs 119 which are of a greater extension than the corresponding width of the fastening aperture are thereby again uniformly deformed and uniformly loaded on both sides so that the danger of breakage thereof during the introduction of the fastening element into the fastening aperture or while being seated therein is avoided.

As may be recognized especially from FIG. 5, the shank 111 is slightly tapered towards the free end thereof, as shown at 123, in order to facilitate the introduction into a fastening aperture.

While two exemplary embodiments of the invention have been described in detail, it will apparent to those skilled in the art that the disclosed embodiments may be modified. Therefore, the foregoing description is to be considered exemplary rather than limiting and that the scope of the invention is to be determined by the attached claims.

I claim:

1. A one-piece fastening element of synthetic material comprising a head and a relatively rigid shank adapted to be inserted in an aperture in a workpiece, said shank having a longitudinal axis and including a shank portion having a pair of transversely extending webs wherein each web has marginal edges, and a longitudinally extending web extending between and interconnecting said pair of webs, at least two axial rows of flexible lamellar radial ribs formed integrally with said shank, circumferentially offset and including a plurality of said ribs in axially spaced arrangement, each row extending radially outwardly from said longitudinal web and from between respective marginal edges of said pair of webs, whereby the marginal edges of said pair of webs are adapted to generally centrally locate the longitudinal axis of said shank relative to the center of said aperture and said ribs are adapted to engage said workpiece about the periphery of said aperture to secure said fastening element relative thereto.

2. Fastening element according to claim 1, wherein said transverse webs radially taper towards the free end of the shank.

3. Fastening element according to claim 1 or 2, wherein there are two diametrically opposed rows of lamellar ribs formed integrally with the shank and the transversely extending webs each include two circumferentially spaced axial guide surfaces.

4. Fastening element according to claim 3, wherein the shank and the transversely extending webs formed integrally therewith are of double-T-shaped cross sectional configuration and the lamellar ribs extend from recesses formed between the transversely extending webs on both sides of the longitudinal web and are in part freely movable with respect to the transversely extending webs.

5. Fastening element according to claim 4, wherein there are rectangular recesses in the longitudinal web of the double-T-shaped shank.

6. Fastening element according to claim 4, wherein when the fastening element is to be used with circular apertures the transversely extending webs of the double-T-shaped shank are chamfered along the marginal edges for the formation of guide surfaces.

7. Fastening element according to claim 6, wherein in the region of the ribs, the shank is reduced in its cross sectional configuration in the direction of the radial extension of the ribs.

8. Fastening element according to claim 7 wherein the shank and the transversely extending webs, respectively, in the region proximate the head are tapering in the direction towards the head.

* * * * *